March 6, 1928.
E. E. GREVE
1,661,285
ROTARY DRILLING MACHINE
Filed Aug. 3, 1926
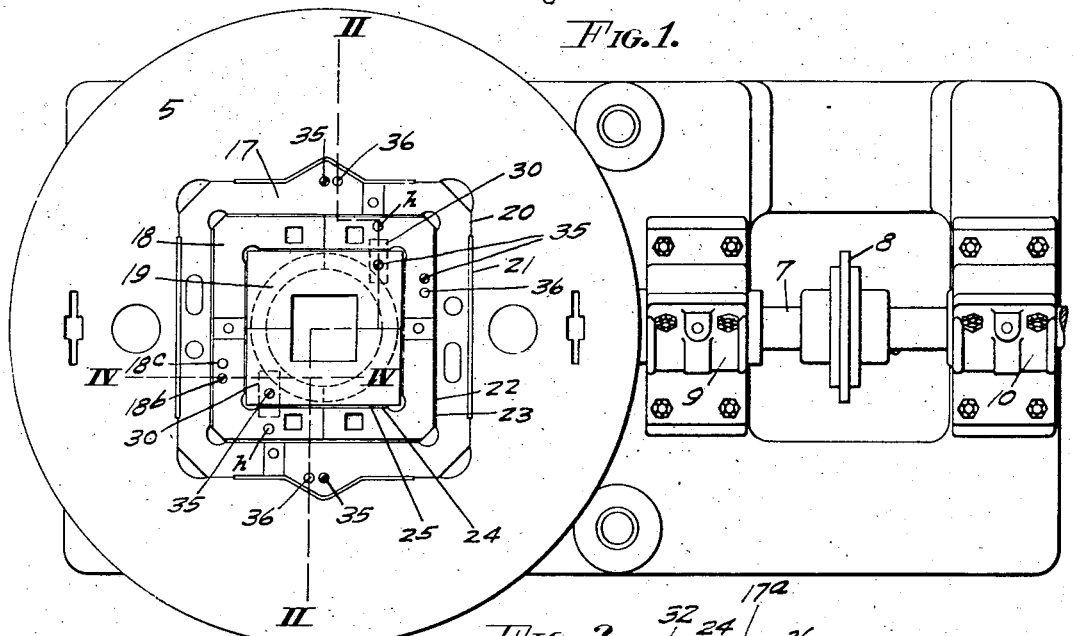
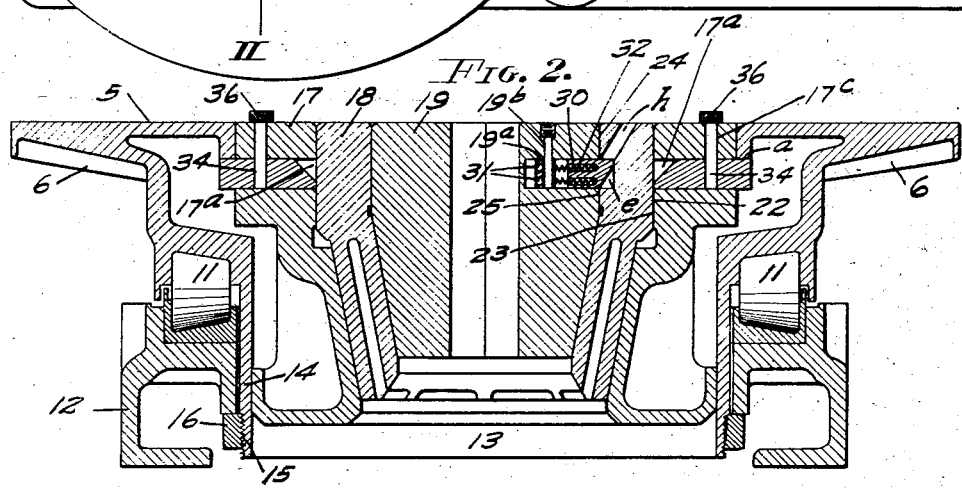
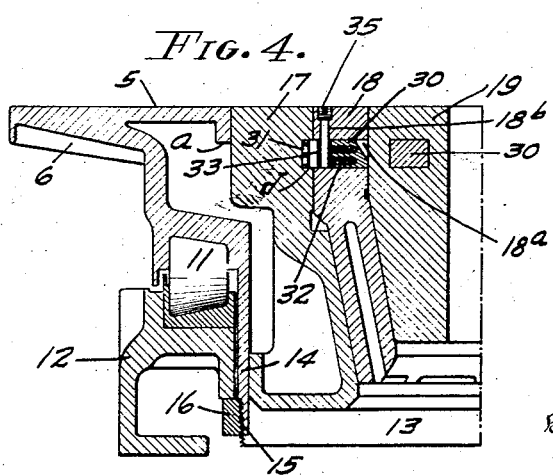
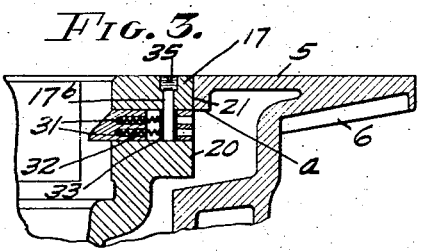
Inventor
E. E. Greve
By W. J. Doolittle
Attorney Patented Mar. 6, 1928.

1,661,285

UNITED STATES PATENT OFFICE.

EDGAR E. GREVE, OF BELLEVUE, PENNSYLVANIA.

ROTARY DRILLING MACHINE.

Application filed August 3, 1926. Serial No. 126,922.

My invention relates to improvements in rotary drilling machines, and more particularly to the rotary table or the drive-ring thereof and the cooperating drive members nested in the table or drive-ring and utilized for transmitting power from the rotary to the drilling string.

The prime object of the present invention is to provide simple and efficient automatically operable means for locking the rotary table, drive or gear ring, and the cooperating drive members associated therewith, against relative vertical movement or vertical displacement of the drive members.

A further object is to provide a construction permitting the said drive members to be locked against vertical displacement by the act of nesting or assembling the said members.

In the accompanying drawing, which illustrates an application of my invention,

Fig. 1 is a top plan view of a rotary drilling machine embodying my invention;

Fig. 2, a vertical sectional view taken on line II—II of Fig. 1;

Fig. 3, a detail sectional view particularly showing the locking means (in unlocked position) for locking a spider to the table or drive rings; and Fig. 4, a detail sectional view, the section being taken on line IV—IV of Fig. 1.

Referring to the drawing, 5 designates a rotary table having a gear ring 6, the latter being adapted to be driven by a gear, not shown, mounted on an end of a drive shaft 7. 8 designates a drive sprocket mounted on shaft 7, and 9 and 10 bearings for the said drive shaft.

The rotary table is mounted on bearings 11, carried on a base portion 12, and is provided with a central bore or opening 13, as is usual. The table includes an annular depending member 14 having a threaded lower end 15, the latter being designed to receive a thrust collar 16, whereby the table is maintained in the desired position relatively to the base 12.

Arranged within the central opening of the rotary table or drive ring, and adapted to cooperate therewith for driving the drill string, are a plurality of nested drive members, including, as illustrated, an outer spider member or bushing 17, an intermediate spider or bushing 18, and a divided drill stem engaging bushing 19. The spider or bushing members are each provided with flat faces adapted for cooperation with flat faces formed on the table or adjacent bushings. Thus, bushing 17 is formed with flat contacting faces 20 adapted to engage corresponding faces 21 on the walls of the table opening. Bushing 18 is formed with faces 22 for engagement with additional contact faces 23 of the bushing 17, and with faces 24, the latter being adapted to engage the outer flat faces 25 of the bushing 19.

When these drive members are nested or assembled, as shown, with the said flat contacting faces engaging, as above stated, the parts are in driving relation. In order to prevent relative vertical movement of the said drive parts or vertical displacement of the said members, means must be provided. These means constitute an important and characteristic feature of my invention.

As illustrated and as preferred, each bushing or spider member is provided with one or more locking or latch members disposed in openings or recesses formed in the respective members, the said locking members of the respective members 17, 18 and 19 being of substantially the same construction. As shown, these locking members each include a slidable body portion 30, formed with spring receiving openings 31, having springs 32 entered therein, vertically extending pin receiving openings 33 adapted to receive spring abutment pins 35. In addition to these parts, the locking means of members 17 and 18 have vertically extending openings 34 adapted to receive locking pins 36.

In order to receive the locking members, springs and pins, the respective bushing members 17, 18 and 19 are formed with horizontally extending openings 17$^a$ and vertically extending openings 17$^b$ and 17$^c$; 18$^a$, 18$^b$ and 18$^c$; and 19$^a$ and 19$^b$; into which the said locking members 30, and the said pin members 35 and 36 are placed; no locking pin 36 being necessary for the locking means carried by bushing 19.

When the bushing member 17 is positioned in the table, its locking members are designed to engage shoulders $a$ formed on the table, the said members being maintained in the locked position when the inner bushing or bushings have been removed for the insertion of slips, not shown, by means of the locking pins 36. Locking members 30 of the bushing 17, it will be noted, project for a slight distance into the bore of the said bushing, see Fig. 3. These projecting ends will be engaged by the bushing 18 when the latter is inserted in the bushing 17, causing the said locking members of bushing 17 to be moved into the said locked positions.

Somewhat similarly, the other bushing or spider members may be automatically locked against vertical movement by merely positioning an inner bushing within an outer one. Bushing 17 is formed with recesses $d$ to receive the locking members of bushing 18, and bushing 18, in turn, is formed with recesses $e$ to receive the locking members carried by the drill stem engaging bushing 19.

In the driving bushing member 18, I have shown an inclined opening $h$ leading to a recess $e$ of that member, the opening being provided to permit a pin to be inserted to move the locking members of bushing 19 out of the recesses in bushing 18 when it is desired to remove the said bushing 19.

It will be understood that when the several bushings are assembled as shown by Fig. 2, it will not be necessary to insert the locking pins 36, in order to maintain the bushings in locked positions, the pins 36 being employed only when it is desired to lift the inner bushing or the inner and intermediate bushings from the table for the purpose of introducing pipe engaging slips into the space from which the bushings were taken. It will be further noted that a removal of the inner bushing will automatically release the locking means of the intermediate bushing from the outer bushing, and a removal of the intermediate bushing will release the locking means between the outer bushing and the table.

What I claim is:

1. In a rotary drilling machine, a rotary table having a bore, a bushing nested therein, and automatically operable locking means for locking the table and bushing against relative vertical movement characterized in that the locking means are actuated to lock said members together by positioning a member within the bushing.

2. In a rotary drilling machine, a rotary table, a plurality of drive members nested therein, and automatically operable locking means for locking the drive members and the table against relative vertical movement characterized in that the locking means are moved to locked position when an inner drive member is placed in position within an outer drive member.

3. In a rotary drilling machine, a rotary table having a bore, an inner and an outer drive bushing nested in the bore, automatically operable locking means carried by the outer bushing and coacting with the table for preventing relative vertical movement therebetween, said locking means constructed and arranged to be actuated by positioning the inner bushing member within the outer bushing member.

4. In a rotary drilling machine, a rotary table having a bore, a plurality of drive bushings nested in the bore, said bushings having coacting locking means for preventing relative vertical movement within the bore, said locking means arranged and constructed to be actuated by positioning one bushing within another.

5. In a rotary drilling machine, a rotary table having a bore, a plurality of drive bushings nested in the bore, said bushings having coacting locking means for preventing relative vertical movement within the bore, said locking means arranged and constructed to be actuated by positioning one bushing within another and including a spring pressed slidable member.

6. In a rotary drilling machine, a rotary table having a bore, a bushing positioned in the bore, and automatically operable means for locking the table and bushing and releasing the same, characterized in that the locking means are actuated to lock said members together by positioning a member within the bushing and are released by withdrawing said member from the bushing.

In testimony whereof I affix my signature.

EDGAR E. GREVE.